United States Patent Office 3,657,318
Patented Apr. 18, 1972

3,657,318
ARYL MERCAPTO-CARBOXYLIC ACID PHENYL ESTERS
Peter E. Newallis, Leawood, Kans., and Albert J. Poje and Daniel M. Wasleski, Kansas City, Mo., assignors to Chemagro Corporation, Kansas City, Mo.
No Drawing. Filed Mar. 17, 1969, Ser. No. 807,977
Int. Cl. C07c 149/34
U.S. Cl. 260—470
5 Claims

ABSTRACT OF THE DISCLOSURE

Mercapto-carboxylic acid phenyl esters, i.e. (alkyl, phenyl, chloro- and/or alkyl-substituted phenyl, cyano, dialkylaminothiocarbonyl, alkoxycarbonyl-alkyl, benzothiazolyl and alkoxy-substituted benzothiazolyl)-mercapto-acetic acid (mono- to penta- chloro, bromo, alkoxy, fluoroalkyl and/or nitro substituted)-phenyl esters, which possess fungicidal properties and which may be produced by conventional methods.

---

The present invention relates to and has for its objects the provision for particular new mercapto-carboxylic acid phenyl esters, i.e. (alkyl, phenyl, chloro- and/or alkyl-substituted phenyl, cyano, dialkylaminothiocarbonyl, alkoxycarbonyl-alkyl, benzothiazolyl and alkoxy-substituted benzothiazolyl)-mercapto-acetic acid (mono- to pentachloro, bromo, alkoxy, fluoroalkyl and/or nitro substituted)-phenyl esters, which possess valuable fungicidal properties, active compositions in the form of mixtures of such compounds with solid and liquid dispersible carrier vehicles, and methods for producing such compounds and for using such compounds in a new way, especially for combating fungi, with other and further objects becoming apparent from a study of the within specification and accompanying examples.

It is not believed that any mercapto-carboxylic acid phenyl esters of analogous constitution are known and/or known to possess strong and broad spectrum fungicidal properties.

It has now been found, in accordance with the present invention, that the particular new mercapto-carboxylic acid phenyl esters of the general formula

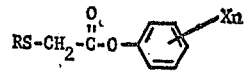

(I)

in which
R is alkyl of 1–14 carbon atoms; phenyl; substituted phenyl which is substituted with 1–3 chloro and/or alkyl of 1–4 carbon atoms; cyano; dialkyl-amino-thiocarbonyl having 1–4 carbon atoms in each corresponding alkyl moiety; alkoxy carbonyl-alkyl having 1–4 carbon atoms in the alkoxy moiety and 1–4 carbon atoms in the alkyl moiety; benzothiazol-2-yl; or alkoxy-substituted benzothiazol-2-yl having 1–4 carbon atoms in the alkoxy moiety;
X, each individually, is chloro, bromo, alkoxy of 1–4 carbon atoms, fluoro-substituted alkyl of 1–4 carbon atoms having 1–3 fluoro groups, or nitro; and
n is a whole number from 1–5, exhibit strong fungical properties.

It has been furthermore found, in accordance with the present invention, that the compounds of Formula I above may be produced by a process which comprises reacting the corresponding alpha-chloro ester of the formula

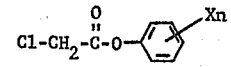

(II)

in which X and n are the same as defined above, with a sulfur nucleophile, i.e. a mercaptan in the presence of an acid-binding agent, or the salt form of such mercaptan, of the formula

RS—M (III)

in which R is the same as defined above and M is hydrogen or a salt-forming cation, such as ammonium or alkali metal (e.g. Na, K, etc.), optionally in the presence of a solvent.

Surprisingly, the mercapto-carboxylic acid phenyl esters of the present invention are chemically completely novel compounds unobvious over the prior art. Because of their strong, especially broad spectrum, fungicidal activity, the instant compounds therefore represent a valuable enrichment of the art.

If, for instance, p-chloro-benzenethiol (IIIa) and 2,4,5-trichloro-phenyl-alpha-chloro acetate (IIa) are used as starting materials with triethylamine as the HCl acceptor, the course of the reaction can be represented by the following equation:

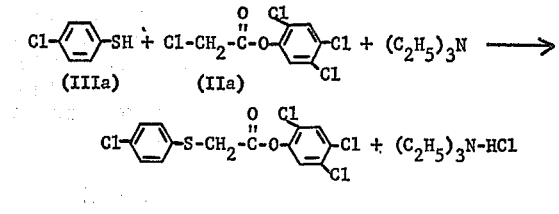

($1_1$)

Advantageously, in accordance with the present invention, in the various formulae herein:
R represents
Alkyl hydrocarbon of 1–14 carbon atoms including straight and branched chains, such as methyl, ethyl, n- and iso-propyl, n-, iso-, sec.- and tert.-butyl, n- and iso-amyl, n- and isohexyl, heptyl, octyl, nonyl, decyl, undecyl, dodecyl, tridecyl, tetradecyl, and the like, especially alkyl of 10 to 14 carbon atoms, and more especially 1,1-dimethyl-decyl;
Phenyl;
Substituted phenyl which is substituted with 1–3 or 1–2 chloro; or
Lower alkyl of 1–4 carbon atoms, such as methyl to tert.-butyl inclusive, and the like, as defined above;
Especially 2-, 3-, 4- mono and 2,3-, 2,4-, 2,5-, 2,6-, 3,4- and/or 3,5-di chloro and $C_{1-4}$ alkyl substituents;
Cyano (i.e. —CN);
Di-lower alkyl-aminothiocarbonyl having 1–4 carbon atoms in each alkyl moiety, such as di(same or mixed) methyl to tert.-butyl inclusive, and the like, as defined above, -aminothio-carbonyl, i.e. di-lower alkyl-amino-thiono, e.g.

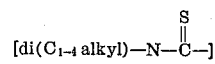

Lower alkoxy carbonyl-lower alkyl having 1–4 carbon atoms in the alkoxy moiety and 1–4 carbon atoms in the alkyl moiety, such as methoxy, ethoxy, n- and iso-propoxy, n-, iso-, sec.- and tert.-butoxy-, and the like, -carbonyl-methyl to tert.-butyl inclusive, and the like, as defined above, i.e., $C_{1-4}$ alkoxy carbonyl-$C_{1-4}$ alkyl or carbo-$C_{1-4}$ alkoxy-$C_{1-4}$ alkyl, especially $C_{1-4}$ alkoxy carbonyl- $C_{1-2}$ (preferably methyl) alkyl or carbo $C_{1-4}$ alkoxy-$C_{1-2}$ (preferably methyl) alkyl, e.g.

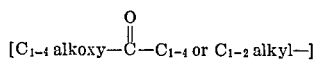

Benzothiazol-2-yl; or

Lower alkoxy substituted benzothiazol-2-yl having 1–4 carbon atoms in the alkoxy moiety such as methoxy to tert.-butoxy inclusive, and the like, as defined above, -substituted benzothiazol-2-yl, especially the 6- position $C_{1-4}$ or $C_{1-2}$ (preferably ethoxy) alkoxy substituted benzothiazol-2-yl;

X, each individually, represents

Chloro;

Bromo;

Lower alkoxy of 1–4 carbon atoms such as methoxy to tert.-butoxy inclusive, and the like, as defined above, especially $C_{1-2}$ alkoxy;

Fluoro substituted lower alkyl of 1–4 carbon atoms having 1–3 fluorosubstituents such as mono to tri fluoro methyl, mono to tri fluoro ethyl, n- and iso- propyl, n-, iso-, sec.- and tert.-butyl, and the like, especially mono to tri fluoro $C_{1-2}$ alkyl, more especially tri fluoro $C_{1-4}$ or $C_{1-2}$ alkyl, and most especially trifluoromethyl; or Nitro; and N represents a whole number from 1–5, especially 1–4.

Preferably, R is $C_{10-14}$ alkyl, especially $C_{12}$ branched chain alkyl; or 4-chlorophenyl, 2,4-dichlorophenyl or 4-($C_{1-4}$ alkyl)-phenyl; or cyano; or di($C_{1-4}$ or $C_{1-2}$ alkyl) aminothiocarbonyl; or $C_{1-4}$ alkoxy carbonyl-$C_{1-4}$ or $C_{1-2}$ alkyl; or benzothiazol-2-yl or 6-($C_{1-4}$ alkoxy)-benzothiazol-2-yl); X, each individually, is chloro; bromo; $C_{1-4}$ lower alkoxy, especially methoxy; fluoro-$C_{1-4}$ alkyl, especially trifluoromethyl; or nitro; and $n$ is 1–4; $X_n$ especially contemplating 2,4-di and 2,4,5-tri chloro, 4-bromo, 4-($C_{1-4}$ alkoxy), more especially 4-methoxy, 3-trifluoromethyl, 2-chloro - 4 - nitro, 2-nitro-4-chloro, 2,4,5-trichloro-6-nitro, and the like.

Preferred compounds include:

(1) 4-chloro-penylmercapto-acetic acid 2′,4′,5′-trichlorophenyl ester;

(4) N,N-dimethyl-dithiocarbamato-acetic acid 2,4,5-trichlorophenyl ester;

(3) 6-ethoxy-benzothiazol-2-ylmercapto-acetic acid 2′,4′,5′-trichloro-phenyl ester;

(9) carbo-n-butoxy-methylmercapto-acetic acid 2,4,5-trichlorophenyl ester;

(14) benzothiazol-2-ylmercapto-acetic acid 2′,4′,5′-trichlorophenyl ester;

(15) 2,4-dichloro-phenylmercapto-acetic acid 2′,4′,5′-trichlorophenyl ester;

(7) 4-tert.-butyl-phenylmercapto-acetic acid 2′,4′,5′-trichlorophenyl ester; and

(16) thiocyanato-acetic acid 2-nitro-4-chloro-phenyl ester.

The types of starting alpha-chloro esters usable in accordance with the process of the present invention are clearly characterized by Formula II stated above. These starting compounds are well known and can be prepared readily on an industrial scale.

As examples of such starting alpha-chloro esters which can be used according to the present invention, there may be mentioned in particular:

4-chloro-phenyl-alpha-chloro-acetate
4-bromo-phenyl-alpha-chloroa-acetate
2,4-dichloro-penyl-alpha-chloro-acetate
2,4,5-trichloro-phenyl-alpha-chloro-acetate
4-anisyl-alpha-chloro-acetate
4-nitrophenyl-alpha-chloro-acetate
3-trifluoromethyl-phenyl-alpha-chloro-acetate
2-nitro-4-chloro-phenyl-alpha-chloro-acetate
2,4,5-trichloro-6-nitro-phenyl-alpha-chloro-acetate
2-chloro-4-nitro-phenyl-alpha-chloro-acetate, and the like.

The types of sulfur nucleophiles usable as starting materials in accordane with the process of the present invention are clearly characterized by Formula III stated above.

These starting compounds are also well known and can be prepared readily on an industrial scale.

As examples of such starting sulfur nucleophiles which can be used with a hydrogen chloride acceptor or directly as an ammonium or alkali metal salt (e.g. sodium or potassium salt) according to the present invention, there may be mentioned in particular:

ethyl mercaptan
n-butyl mercaptan
n-dodecyl mercaptan
1,1-dimethyl-decyl mercaptan (i.e. 2-methyl-undec-2-yl mercaptan)
benzenethiol
4-chloro-benzenethiol
2,4-dichloro-benzenethiol
4-methyl-benzenethiol
4-tert.-butyl-benzenethiol
ammonium thiocyanate
sodium thiocyanate
potassium thiocyanate
trimethylammonium N,N-dimethyl-dithiocarbamate
sodium N,N-dimethyl-dithiocarbamate
n-butyl-alpha-mercapto-acetate
ethyl-alpha-mercapto-acetate
2-mercapto-benzothiazole
2-mercapto-5-ethoxy-benzothiazole
2-mercapto-6-ethoxy-benzothiazole, and the like.

The production reaction is carried out in the presence of an inert organic solvent (this term also includes a mere diluent). Examples of such solvents are esters such as ethyl acetate, ketones such as acetone or methyl ethyl ketone, nitriles such as acetonitrile, amides such as dimethylformamide and sulfones such as tetrahydrothiophene-1,1-dioxide; and the like. The preferred solvents are acetone and acetonitrile.

In the case where a free mercaptan is used, it is advantageous to utilize an acid-binding agent such as a tertiary amine or inorganic base to bind the liberated hydrogen chloride. Normally, the acid-binding agent is used in an equimolar amount, based on the free mercaptan. Tertiary amines which can be employed are pyridine, 2,3 and 4 picolines, sym-collidine, and the like, and inorganic bases which can be employed are for example sodium carbonate, potassium carbonate, and the like.

The reaction temperature may be varied within a fairly wide range. In general, the reaction is carried out at substantially between about 20–150° C., preferably between about 40–100° C.

In general, the reactants are used in approximately equimolar proportions. The order of addition of the reactants can be varied, although usually the alpha-chloro ester is added first followed by the addition of the mercaptan or its salt.

Catalysts such as potassium iodide may be used optionally to facilitate the reaction, if desired.

After completion of the reaction, evaporation of the volatile constituents is effected in the usual way. The residue may then be extracted with a water immiscible solvent such as methylene chloride, chloroform, benzene, and the like, and the organic solution may then be washed with water. Drying may be accomplished with one of the common drying agents such as magnesium sulfate, sodium sulfate, magnesium chloride, and the like, and the solvent is removed under vacuum, leaving the product as the residue, which in many cases can be recrystallized.

Advantageously, the active compounds according to the present invention exhibit strong fungitoxic properties, with comparatively low toxicity to warm-blooded creatures and concomitantly low phytotoxicity. Hence, the instant compounds are suitable for use as plant protection agents, and in the hygiene field, for the control of fungi, particularly phytopathogenic fungi.

As to the fungicidal properties, the instant compounds possess a broad spectrum of activity.

Thus, the instant compounds can be used for the control of fungi from the most widely different classes of fungi, such as for example, Phycomycetes, Ascomycetes, *Fungi imperfecti,* and the like. The instant compound can give particularly effective results against parasitic fungi on above-ground parts of plants, fungi causing tracheomycosis, which attack the plant from the soil, seed-borne fungi, and soil-borne fungi, such as the organisms *Ceratocystis ulmi, Colletotrichum obiculare, Fusarium lycopersici, Fusarium nivale, helminthosporium sativum, Rhizoctonia solani, Verticillium alboatrum,* Pythium, and the like.

The active compounds according to the instant invention can be utilized, if desired, in the form of the usual formulations or compositions with conventional inert pesticidal diluents or extenders, i.e. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as nonionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or herbicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95%, and preferably 0.5–90%, by weight of the mixture, whereas carrier composition mixtures suitable for direct application or field application generally contemplate those in which the active compound is present in an amount substantially between about 0.0001–2.0%, preferably 0.01–0.8%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compound can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight, of the active compound, or even the 100% active substance alone, e.g. about 20–100% by weight of the active compound.

Furthermore, the present invention contemplates methods of selectively killing, controlling or combating fungi, which comprise applying to at least one of (a) such fungi and (b) their habitat, i.e. the locus to be protected, a fungicidally effective or toxic amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended application, and may be varied within a farily wide range, depending upon the weather conditions, the purpose for which the active compound is used, and the type locus to be treated. Therefore, in special cases, it is possible to go above or below the aforementioned concentration ranges.

The outstanding fungicidal activity of the particular active compounds of the present invention is illustrated, without limitation, by the following examples.

EXAMPLE 1

Fungicidal activity

Agar plate fungicide test [mycelium growth]:

Solvent—99 parts by weight distilled water.
Dispersing agent—1 part by weight of polyoxyethylene sorbitan monolaurate.

To produce a suitable preparation of the particular active compound, 1 part by weight of such active compound is mixed with the stated amount of solvent containing the stated amount of dispersing agent.

The active compound preparation is added to potato dextrose agar (which has been liquefied by heating) in such an amount that the desired concentration of active compound is provided therein. After thorough shaking to achieve a uniform dispersion of the active compound, the agar is poured into Petri dishes under sterile conditions. Control dishes to which the active compound preparation has not been added are also set up.

When the mixture of substrate and active compound has solidified, the dishes are inoculated in the center of the plate with the species of fungi stated in the table and incubated at room temperature (21-25° C.) for 7 days.

After this time, the extent of mycelial growth is determined in relation to the growth of the untreated control by measuring the average radius of the fungal colony from the central point of inoculation to the periphery of mycelial growth. The inhibition of fungal growth is expressed by the values 0 to 10, wherein 0 means that there is no inhibition (full growth as in control) and 10 means that there is comple inhibition (absence of growth).

The particular active compounds tested, their concentrations in the agar used, the test fungi and the inhibition effects achieved can be seen from the following Table 1:

TABLE 1.—AGAR PLATE FUNGICIDE TEST

| Active compound | Conc. in p.p.m. | Cerato-cystis ulmi | Colleto-trichum obiculare | Fusar-ium oxy. f. lyco-persici | Fusar-ium ni-vale | Helmin-thospor-oum sati-vum | Rhizoc-tonia solani | Verticil-lium albo-atrum |
|---|---|---|---|---|---|---|---|---|
| (2₁) Cl-C₆H₄-S-CH₂-C(O)-O-C₆H₂(NO₂)(Cl)(Cl) | 500 / 100 / 10 | 10 / 10 / 8 | 10 / 10 / 0 | 10 / 10 / 0 | 10 / 10 / 0 | 10 / 8 / 0 | 10 / 10 / 0 | 10 / 0 / 0 |
| (1₂) Cl-C₆H₄-S-CH₂-C(O)-O-C₆H₃(Cl)(Cl) | 500 / 100 / 10 | 10 / 10 / 10 | 10 / 10 / 10 | 10 / 10 / 10 | 10 / 10 / 10 | 10 / 10 / 10 | 10 / 10 / 10 | 10 / 10 / 10 |
| (3₁) C₂H₅O-benzothiazole-S-CH₂-C(O)-O-C₆H₃(Cl)(Cl) | 500 / 100 / 10 | 10 / 10 / 10 | 10 / 10 / 10 | 10 / 10 / 10 | 10 / 10 / 10 | 10 / 10 / 10 | 10 / 10 / 10 | 10 / 10 / 10 |
| (4₁) (CH₃)₂N-C(S)-S-CH₂-C(O)-O-C₆H₃(Cl)(Cl) | 500 / 100 / 10 | 10 / 10 / 10 | 10 / 10 / 10 | 10 / 10 / 10 | 10 / 10 / 10 | 10 / 10 / 10 | 10 / 10 / 10 | 10 / 10 / 10 |
| (5₁) Cl-C₆H₄-S-CH₂-C(O)-O-C₆H₄-Br | 500 / 100 / 10 | 8 / 5 / 5 | 8 / 5 / 5 | 5 / 2 / 5 | 8 / 5 / 5 | 5 / 0 / 5 | 8 / 5 / 0 | 8 / 5 / 5 |
| (6₁) NC-S-CH₂-C(O)-O-C₆H₄-CF₃ | 500 / 100 / 10 | 10 / 10 / 5 | 10 / 10 / 8 | 10 / 8 / 2 | 10 / 10 / 10 | 10 / 9 / 8 | 10 / 8 / 10 | 10 / 10 / 5 |
| (7₁) (CH₃)₃C-C₆H₄-S-CH₂-C(O)-O-C₆H₃(Cl)(Cl) | 500 / 100 / 10 | 5 / 2 / 0 | 8 / 0 / 0 | 2 / 0 / 0 | 10 / 0 / 0 | 2 / 0 / 0 | 10 / 0 / 0 | 2 / 0 / 0 |
| (8₁) Cl-C₆H₄-S-CH₂-C(O)-O-C₆H₄-CF₃ | 500 / 100 / 10 | 2 / 0 / 0 | 2 / 0 / 0 | 0 / 0 / 0 | 0 / 0 / 0 | 0 / 0 / 0 | 5 / 2 / 0 | 0 / 0 / 0 |
| (9₁) n-C₄H₉-O-C(O)-CH₂-S-CH₂-C(O)-O-C₆H₃(Cl)(Cl) | 500 / 100 / 10 | 10 / 10 / 10 | 10 / 10 / 10 | 10 / 10 / 10 | 10 / 10 / 10 | 10 / 10 / 10 | 10 / 10 / 10 | 10 / 10 / 10 |
| (10₁) n-C₄H₉-O-C(O)-CH₂-S-CH₂-C(O)-O-C₆H₄-Br | 500 / 10 / 10 | 10 / 5 / 0 | 10 / 2 / 0 | 8 / 5 / 0 | 10 / 0 / 0 | 10 / 5 / 0 | 10 / 8 / 0 | 10 / 5 / 0 |
| (11₁) CH₃(CH₂)₈C(CH₃)₂-S-CH₂-C(O)-O-C₆H₄-Br | 500 / 100 / 10 | 10 / 5 / 0 | 10 / 2 / 0 | 8 / 0 / 0 | 10 / 0 / 0 | 10 / 2 / 0 | 10 / 5 / 0 | 10 / 2 / 0 |
| (12₁) CH₃-C₆H₄-S-CH₂-C(O)-O-C₆H₄-Br | 500 / 100 / 10 | 5 / 5 / 0 | 5 / 5 / 0 | 5 / 2 / 0 | 5 / 0 / 0 | 2 / 0 / 0 | 10 / 10 / 5 | 5 / 0 / 0 |
| (13₁) benzothiazole-S-CH₂-C(O)-O-C₆H₄-Br | 500 / 100 / 10 | 10 / 8 / 5 | 10 / 10 / 0 | 10 / 5 / 0 | 10 / 8 / 0 | 10 / 5 / 0 | 10 / 0 / 0 | 10 / 8 / 0 |

TABLE 1.—Continued

| Active compound | Conc. in p.p.m. | Cerato- cystis ulmi | Colleto- trichum obiculare | Fusar- ium oxy. f. lyco- persici | Fusar- ium ni- vale | Helmin- thospor- oum sati- vum | Rhizoc- tonia solani | Verticil- lium albo- atrum |
|---|---|---|---|---|---|---|---|---|
| (14₁) [benzothiazole]–S–CH₂–C(=O)–O–[2,5-dichlorophenyl] | 500 | 10 | 10 | 10 | 10 | 10 | 10 | 10 |
| | 100 | 10 | 10 | 10 | 10 | 10 | 10 | 10 |
| | 10 | 10 | 10 | 10 | 10 | 10 | 10 | 10 |
| (15₁) Cl–[2-Cl-phenyl]–S–CH₂–C(=O)–O–[2,5-dichlorophenyl] | 500 | 10 | 10 | 10 | 10 | 10 | 10 | 10 |
| | 100 | 10 | 10 | 10 | 10 | 10 | 10 | 10 |
| | 10 | 10 | 10 | 10 | 10 | 10 | 10 | 10 |
| (16₁) NC–S–CH₂–C(=O)–O–[2-NO₂-4-Cl-phenyl] | 500 | 10 | 10 | 10 | 10 | 10 | 10 | 10 |
| | 100 | 10 | 10 | 10 | 10 | 10 | 10 | 10 |
| | 10 | 10 | 10 | 10 | 10 | 10 | 10 | 10 |
| (17₁) NC–S–CH₂–C(=O)–O–[2-Cl-4-NO₂-phenyl] | 500 | 10 | 10 | 10 | 10 | 10 | 10 | 10 |
| | 100 | 10 | 10 | 10 | 10 | 10 | 10 | 10 |
| | 10 | 10 | 8 | 5 | 8 | 5 | 10 | 2 |
| (18₁) NC–S–CH₂–C(=O)–O–[2,4,5-trichlorophenyl] | 500 | 10 | 10 | 10 | 10 | 10 | 10 | 10 |
| | 100 | 10 | 10 | 10 | 10 | 10 | 10 | 10 |
| | 10 | 10 | 10 | 10 | 10 | 10 | 10 | 10 |
| (19₁) NC–S–CH₂–C(=O)–O–[4-OCH₃-phenyl] | 500 | 5 | 5 | 5 | 8 | 5 | 5 | 5 |
| | 100 | 0 | 2 | 0 | 0 | 0 | 2 | 0 |
| | 10 | 0 | 0 | 0 | 0 | 0 | 0 | 0 |
| (20₁) NC–S–CH₂–C(=O)–O–[2,4-dichlorophenyl] | 500 | 10 | 10 | 10 | 10 | 10 | 10 | 10 |
| | 100 | 10 | 10 | 10 | 10 | 10 | 10 | 10 |
| | 10 | 10 | 10 | 10 | 10 | 10 | 10 | 10 |

EXAMPLE 2

Fungicidal activity

Soil fungicide test [rolled towel]:

Wettable powder base consisting of:
  92 parts by weight hydrated silica
  4 parts by weight sodium lignin sulfonate
  4 parts by weight polycondensate of ethylene oxide, propylene oxide and propylene glycol (mol. wt. about 1000)

To produce a suitable preparation of the particular active compound, 1 part by weight of such active compound is mixed intimately with 1 part by weight of the stated wettable powder base.

Separate 0.1 and 0.025 part by weight portions, respectively, of the resulting mixture are blended in turn with 2 parts by weight of clay (attapulgite) and 500 parts by weight of soil infected with the damping off organism (Pythium), to provide 2 corresponding soil portions.

After standing at room temperature for 24 hours, each said active compound-containing soil portion is divided up into three batches and 50 pea seeds are added to each batch. Each batch is then rolled in a paper towel and incubated in a separate can covered with a plastic sheet for 5 days at 4.4° C. and then for an additional 4 days at 24° C.

At the end of the 9 days, the degree of effectiveness in preventing fungal damage of the pea seeds is determined and expressed as a percentage, wherein 0% means that there is no control and 100% means that there is complete control.

The particular active compounds tested, the amounts applied and the results obtained can be seen from the following Table 2:

TABLE 2.—SOIL FUNGICIDE TEST [ROLLED TOWEL]

| Active compound | Active compound concentration in p.p.m. | Control in percent of pythium |
|---|---|---|
| (2₂) Cl–[phenyl]–S–CH₂–C(=O)–O–[2-NO₂-4,5-dichlorophenyl] | 100 | 30 |
| | 25 | 40 |
| (1₃) Cl–[phenyl]–S–CH₂–C(=O)–O–[2,5-dichlorophenyl] | 100 | 90 |
| | 25 | 60 |

TABLE 2.—Continued

| Active compound | Active compound concentration in p.p.m. | Control in percent of pythium |
|---|---|---|
| (3₂) $C_2H_5O$-[benzothiazole]-S-CH₂-C(=O)-O-[2,5-dichlorophenyl-Cl] | 100<br>25 | 60<br>30 |
| (4₂) (CH₃)₂N-C(=S)-S-CH₂-C(=O)-O-[2,5-dichlorophenyl-Cl] | 100<br>25 | 100<br>20 |
| (14₂) [benzothiazole]-S-CH₂-C(=O)-O-[2,5-dichlorophenyl-Cl] | 100<br>25 | 70<br>0 |
| (20₂) NC-S-CH₂-C(=O)-O-[2,5-dichlorophenyl-Cl] | 100<br>25 | 70<br>0 |
| (15₂) Cl-[phenyl-Cl]-S-CH₂-C(=O)-O-[2,5-dichlorophenyl-Cl] | 100<br>25 | 100<br>0 |
| (7₂) (CH₃)₃C-[phenyl]-S-CH₂-C(=O)-O-[2,5-dichlorophenyl-Cl] | 100<br>25 | 90<br>0 |
| (17₂) NC-S-CH₂-C(=O)-O-[2-chloro-4-nitrophenyl] | 100<br>25 | 20<br>0 |

(100 p.p.m.=200 lbs./acre rate.)
(25 p.p.m.=50 lbs./acre rate.)

The following further examples are set forth to illustrate, without limitation, the process for producing the active compounds according to the present invention.

EXAMPLE 3

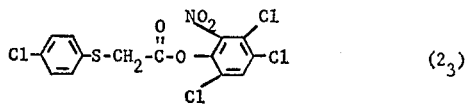

(2₃)

14.2 grams (0.05 mol) of (2,4,5-trichloro-6-nitro) phenyl-alpha-chloro-acetate were dissolved in 150 ml. of acetone. To the resulting solution were added 7.7 grams (0.035 mol) para-chloro-thiophenol (i.e. 4-chloro-benzenethiol) followed by the addition of 4 ml. (0.05 mol) of pyridine. The reaction mixture was refluxed for 14 hours and allowed to stand overnight. The solvent was evaporated, and the residue was extracted with chloroform, washed twice with water, dried over magnesium sulfate and the chloroform was then removed by evaporation. A yield was obtained of 15.6 grams (73% of theory) of 4-chloro-phenylmercapto-acetic acid 2′,4′,5′-trichloro-6′-nitro-phenyl ester in the form of a yellow oil.

I.R. absorption: 1690 cm.⁻¹.

EXAMPLE 4

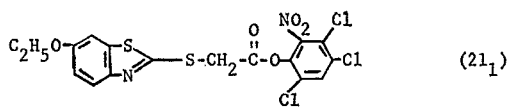

(21₁)

4.2 grams (0.05 mol) of (2,4,5-trichloro-6-nitro)phenyl-alpha-chloro-acetate and 11.0 grams (0.053 mol) of 2-mercapto-6-ethoxy-benzothiazole were suspended in 150 ml. of acetone. To this suspension were added 4.0 ml. (0.05 mol) of pyridine. The reaction mixture was refluxed for 11 hours, quenched with water, and the solid product, i.e. 6 - ethoxy-benzothiazol-2-ylmercapto-acetic acid 2′,4′, 5′-trichloro-6′-nitro-phenyl ester, was filtered. The yield was 16.7 grams (68% of theory). M.P. 137–140° C.

*Analysis.*—Calcd. (percent): Cl, 21.5. Found (percent): Cl, 21.5.

I.R. absorption: 1680 cm.⁻¹.

EXAMPLE 5

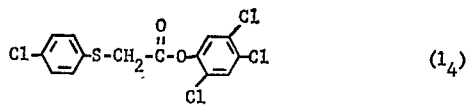

(1₄)

13.7 grams (0.05 mol) of 2,4,5-trichloro-phenyl-alpha-chloro-acetate and 7.7 grams (0.053 mol) of para-chloro-thiophenol were suspended in 150 ml. of acetone. Pyridine (4 ml., 0.05 mol) was added and the reaction mixture was refluxed for 10 hours. The acetone was removed by evaporation and the residue was extracted with chloroform, washed twice with water, dried, and the chloroform removed by evaporation. The yield was 18.9 grams (97% of theory) of a pale yellow oil, i.e. 4-chloro-phenyl-mercapto-acetic acid 2′,4′,5′-trichloro-phenyl ester.

*Analysis.*—Calc. (percent): Cl, 21.5. Found (percent): (percent): Cl, 36.3; S, 7.62.

I.R. absorption: 1685 cm.⁻¹.

EXAMPLE 6

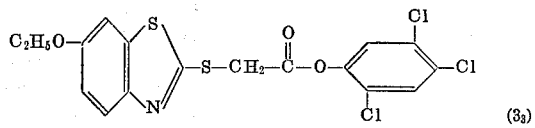 (3ₐ)

13.7 grams (0.05 mol) of 2,4,5-trichloro-phenyl-alpha-chloro-acetate and 11.3 grams (0.053 mol) of 2-mercapto-6-ethoxy-benzothiazole were suspended in 150 ml. of acetone. Pyridine (4.0 ml., 0.05 mol) was added and the reaction mixture was heated at reflux for 16 hours. The product was then quenched with water and the formed solid was filtered, giving a yield of 16.6 grams of 6-ethoxy-benzothiazol-2-ylmercaptoacetic acid 2′,4′,5′-trichloro-phenyl ester in the form of a purple solid.

I.R. absorption: 1660 cm.⁻¹.

EXAMPLE 7

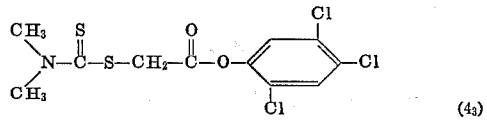 (4ₐ)

A mixture of 13.7 grams (0.05 mol) of 2,4,5-trichloro-phenyl-alpha-chloro-acetate and 0.2 gram (0.053 mol) of sodium N,N-dimethyl-dithiocarbamate in 150 ml. of acetone was heated at reflux for 16 hours. The reaction mixture was quenched in water and the solid which formed was filtered, giving 6.0 grams (36% yield) of N,N-dimethyl-dithiocarbamato-acetic acid 2,4,5-trichloro-phenyl ester, M.P. 99–100° C.

I.R. absorption: 1620 cm.⁻¹.

EXAMPLE 8

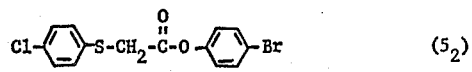 (5₂)

A mixture of 12.5 grams (0.05 mol) of 4-bromo-phenyl-alpha-chloro-acetate, 7.5 grams (0.052 mol) of 4-chloro-benzenethiol and 4.1 grams (0.52 mol) of pyridine in 250 ml. of acetone was refluxed for 40 hours. The resulting precipitate was filtered and the acetone was removed under reduced pressure. The residue was then dissolved in methylene chloride, washed several times with water and dried. The methylene chloride was then removed under reduced pressure leaving a residue of 20 grams of a white solid melting at 77–82° C., which on recrystallization from cyclohexane melted at 90–93° C. The yield was 78% of 4-chloro-phenylmercapto-acetic acid 4′-bromophenyl ester.

*Analysis.*—Calc. for sulfur (percent): 9.0. Found (percent): 9.6.

I.R. absorption: 1740 cm.⁻¹.

EXAMPLE 9

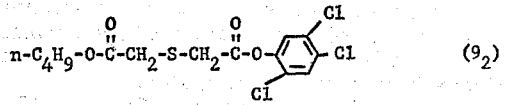 (9₂)

A mixture of 13.8 grams (0.05 mol) of 2,4,5-trichloro-phenyl-alpha-chloro-acetate, 8 grams (0.055 mol) of n-butyl-thioglycolate (i.e. n-butyl-alpha-mercapto-acetate) and 5.5 grams (0.055 mol) of triethylamine in 300 ml. of acetone was refluxed for 40 hours. At the end of this period, the solid which formed was filtered and the acetone removed under reduced pressure. The residue was then dissolved in methylene chloride, washed with water and the methylene chloride was removed under reduced pressure. 10.5 grams of carbo-n-butoxy-methylmercapto-acetic acid 2,4,5-trichloro-phenyl ester in the form of an amber oil was obtained.

*Analysis.*—Calc. for sulfur (percent): 8.3. Found (percent): 8.05.

I.R. absorption: 1730, 1710 cm.⁻¹.

EXAMPLE 10

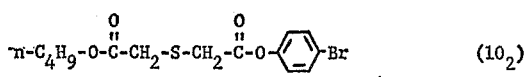 (10₂)

12.5 grams (0.05 mol) of 4-bromo-phenyl-alpha-chloro-acetate and 8 grams (0.054 mol) of n-butyl-thioglycolate were dissolved in acetone. To this solution was added 6 grams (0.06 mol) of triethylamine. The formation of the precipitate was immediate and the reaction mixture was allowed to reflux for 24 hours. After the solid was filtered, the filtrate was evaporated under reduced pressure. The residue was then dissolved in methylene chloride, washed several times with water and dried by means of azeotropic distillation with benzene. After removal of the organic solvents, 18.5 grams of a light brown oil remained, i.e. carbo-n-butoxy - methylmercapto - acetic acid 4 - bromophenyl ester. This represents a yield of approximately 100%.

*Analysis.*—Calc. for sulfur (percent): 8.86. Found (percent): 8.1.

I.R. absorption: 1745 cm.⁻¹ (broad).

EXAMPLE 11

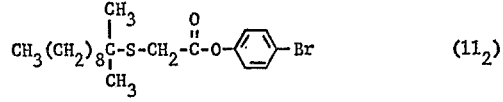 (11₂)

To an acetone solution of 7 grams (0.025 mol) of 4-bromo-phenyl-alpha-chloro-acetate and 8.5 grams (0.042 mol) of 1,1-dimethyl-decyl-mercaptan was added 4.3 grams (0.043 mol) of triethylamine. The reaction mixture was refluxed for 40 hours and the resulting precipitate was filtered. Removal of the acetone under reduced pressure was followed by dissolution of the residue in methylene chloride, washing several times with water and drying by means of azeotropic distillation with benzene. Further removal of the organic solvents left 14 grams of 1,1-dimethyl-decylmercapto-acetic acid 4′-bromo-phenyl ester in the form of a light brown oil. The yield of product was quantitative.

I.R. absorption: 1680 cm.⁻¹.

EXAMPLE 12

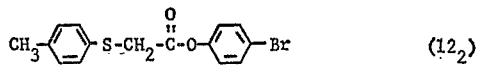 (12₂)

To an acetone solution of 10 grams (0.04 mol) of 4-bromo-phenyl-alpha-chloro-acetate and 5.5 grams (0.044 mol) of 4-methyl-benzenethiol was added 5 grams (0.05 mol) of triethylamine. The formation of a precipitate was immediate and the reaction mixture was refluxed for 24 hours. The solid was then filtered and the acetone removed under reduced pressure. The residue was washed with water and dried by azeotropic distillation with benzene. The resulting solid was recrystallized from hexane giving 6 grams of a solid melting 55–63° C. The yield was 39% of 4-methyl-phenylmercapto-acetic acid 4′-bromo-phenyl ester.

*Analysis.*—Calc. for carbon (percent): 53.5. Found (percent): 53.11. Calc. for hydrogen (percent): 3.86. Found (percent): 3.72.

I.R. absorption: 1690 cm.⁻¹.

EXAMPLE 13

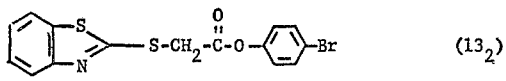 (13₂)

To a mixture of 5 grams (0.02 mol) of 4-bromo-phenyl-alpha-chloro-acetate and 3.5 grams (0.021 mol) of 2-mercapto-benzothiazole in 300 ml. of acetone was added 4 grams (0.04 mol) of triethylamine. Formation of the corresponding hydrochloride precipitate was immediate. The reaction mixture was refluxed for 72 hours and the solid was filtered. The acetone was removed under reduced pressure and the residue dissolved in methylene chloride. This solution was washed with water and the organic phase evaporated in vacuo. A black solid, i.e. benzothiazol-2-ylmercapto-acetic acid 4'-bromo-phenyl ester, was obtained as product.

I.R. absorption: 1675 cm.$^{-1}$.

EXAMPLE 14

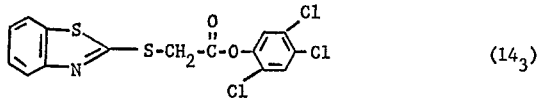 (14$_3$)

To a mixture of 8 grams (0.029 mol) of 2,4,5-trichlorophenyl-alpha-chloro-acetate and 5 grams (0.030 mol) of 2-mercapto-benzothiazole dissolved in 250 ml. of acetone were added 4.5 ml. (0.032 mol) of triethylamine. The reaction mixture darkened immediately and was refluxed for 72 hours. The solid was filtered and the acetone was removed under reduced pressure. The residue was then dissolved in methylene chloride, dried by azeotropic distillation with benzene and the remaining solvent removed under reduced pressure. The resulting solid product was benzothiazol-2-ylmercapto-acetic acid 2',4',5'-trichlorophenyl ester.

I.R. absorption: 1675 cm.$^{-1}$.

EXAMPLE 15

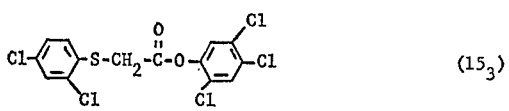 (15$_3$)

To a mixture of 10 grams (0.036 mol) of 2,4,5-trichlorophenyl-alpha-chloro-acetate and 6.7 grams (0.037 mol) of 2,4-dichloro-benzenethiol dissolved in 125 ml. of acetone were added 3 ml. (0.04 mol) of triethylamine. Formation of a precipitate was immediate and the reaction mixture was refluxed for 4 hours. The solid was then filtered and was stirred with water and dried giving 12 grams of a material melting at 119–121° C. Recrystallization from a chloroform-hexane mixture gave a white solid, i.e. 2,4-dichloro-phenylmercapto-acetic acid 2',4',5'-trichloro-phenyl ester, melting at 123° C.

Analysis.—Calc. for carbon (percent): 40.4. Found (percent): 40.5. Calc. for hydrogen (percent): 1.68. Found (percent): 2.12.

I.R. absorption: 1750 cm.$^{-1}$.

EXAMPLE 16

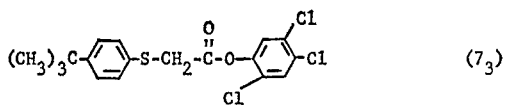 (7$_3$)

To a mixture of 8 grams (0.029 mol) of 2,4,5-trichloro-phenyl-alpha-chloro-acetate and 5.3 grams (0.029 mol) of 4-tert.-butyl-benzenethiol dissolved in 100 ml. of acetone were added 4.1 ml. (0.03 mol) of triethylamine. The reaction mixture was refluxed for 40 hours. The acetone was removed under reduced pressure leaving a yellow-tan solid as residue. This residue was dissolved in methylene chloride, washed with water and the methylene chloride was removed under reduced pressure. The residue was dried by azeotropic distillation with benzene. Recrystallization of the solid gave 6 grams of 4-tert.-butyl-phenylmercapto-acetic acid 2',4',5'-trichloro-phenyl ester melting at 93–95° C.

Analysis.—Calc. for C$_{15}$H$_{10}$ClS$_3$OS (percent): Carbon 52.0, hydrogen 3.9, sulfur 9.25. Found (percent): Carbon 51.6, hydrogen 3.02, sulfur 9.3.

EXAMPLE 17

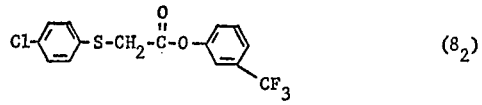 (8$_2$)

To a mixture of 9 grams (0.038 mol) of 3-trifluoromethyl-phenyl-alpha-chloro-acetate and 5.6 grams (0.039 mol) of 4-chloro-benzenethiol in 250 ml. of acetone were added 5.4 ml. (0.04 mol) of triethylamine. The reaction mixture was refluxed for 16 hours. The precipitate was filtered and the acetone was removed by evaporation. The residue then was dissolved in methylene chloride, washed with water and the methylene chloride was removed by evaporation. The resulting oil solidified on standing and recrystallization afforded 10 grams of solid. M.P. 64–68° C. (from hexane). The yield was 76% of 4-chlorophenylmercapto-acetic acid 3' - trifluoro - methyl - phenyl ester.

Analysis.—Calc. for C$_{15}$H$_{10}$ClF$_3$OS (percent): Carbon, 52.0; hydrogen, 3.9; sulfur, 9.25. Found (percent): Carbon, 51.6; hydrogen, 3.02; sulfur, 9.3.

I.R. aborption: 1725 cm.$^{-1}$.

EXAMPLE 18

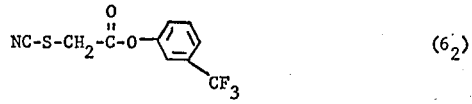 (6$_2$)

To a mixture of 12 grams (0.05 mol) of 3-trifluoromethyl-phenyl-alpha-chloro-acetate in 150 ml. of acetone were added 4.5 grams (0.06 mol) of ammonium thiocyanate. The reaction mixture was refluxed for 4 hours, cooled, and the acetone was removed by vacuum distillation. The residue was extracted with methylene chloride, dried and the solvent was removed by evaporation. The product was then distilled, giving 9.6 grams of a yellow liquid, i.e. thiocyanato-acetic acid 3-trifluoromethyl-phenyl ester, boiling at 110° C. (0.1 millimeter).

Analysis.—Calc. for carbon 46.1%, found 45.8%; hydrogen 2.3%, found 2.67%; nitrogen 5.38%, found 5.62%.

I.R. absorption: 1760, 2150 cm.$^{-1}$.

EXAMPLE 19

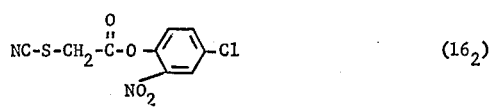 (16$_2$)

To a mixture of 10 grams (0.04 mol) of 2-nitro-4-chloro-phenyl-alpha-chloro-acetate in 150 ml. of acetone were added 3.8 grams (0.05 mol) of ammonium thiocyanate dissolved in 100 ml. of acetone. The reaction mixture was stirred at room temperature for 24 hours, after which time the solid was filtered. Removal of the acetone by evaporation gave a yellow solid which was washed with water and extracted with methylene chloride. After drying over magnesium sulfate and removal of the methylene chloride, a yellow precipitate was obtained which was recrystallized from chloroform-hexane mixture, giving 7.5 grams of solid thiocyanato-acetic acid 2-nitro-4-chloro-phenyl ester, melting at 64–67° C.

Analysis.—Calc. for (percent): Carbon, 39.2; hydrogen, 1.8; nitrogen, 10.3. Found (percent): Carbon, 39.1; hydrogen, 1.8; nitrogen, 9.6.

I.R. absorption: 1765, 2155 cm.$^{-1}$.

EXAMPLE 20

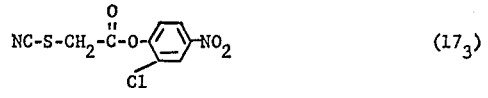 (17$_3$)

To 7.5 grams (0.03 mole) of 2-chloro-4-nitro-phenyl-alpha-chloro-acetate, dissolved in 150 ml. of acetone were added 2.3 grams (0.03 mole) of ammonium thiocyanate dissolved in 100 ml. of acetone. Approximately 0.5 gram of potassium iodide was added as a catalyst. The reaction mixture was heated at 40° C. for 30 hours and the resulting solid was filtered. The acetone was removed under reduced pressure leaving an orange oil. This oil was dissolved in ether, washed with water and dried over magnesium sulfate. Removal of the ether left an orange semi-solid, i.e. thiocyanatoacetic acid 2-chloro-4-nitro-phenyl ester, which solidified on refrigeration with a mixture of hexane and ether.

*Analysis.*—Calc. for (percent): Nitrogen, 10.3; sulfur, 11.9. Found for (percent): Nitrogen, 10.3; sulfur, 11.4.

I.R. absorption: 1765, 2150 cm.$^{-1}$.

EXAMPLE 21

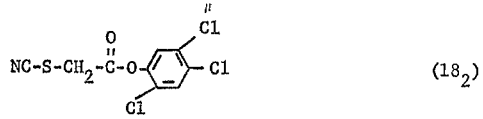
($18_2$)

To 13.8 grams (0.05 mol) of 2,4,5-trichloro-phenyl-alpha-chloro-acetate in 150 ml. of acetone were added 4.1 grams (0.053 mol) of ammonium thiocyanate in 75 ml. of acetone. This mixture was heated at gentle reflux for 12 hours, the solid was filtered and the acetone removed under reduced pressure. The residue was dissolved in ether, washed with water and dried over magnesium sulfate, and the ether was then removed under reduced pressure, leaving a solid residue of thiocyanatoacetic acid 2,4,5-trichloro-phenyl ester.

*Analysis.*—Calc. for (percent): C, 36.6; H, 1.3; S, 11.2; N, 4.7. Found (percent): C, 36.0; H, 1.4; S, 11.6; N, 5.0.

I.R. absorption: 1770, 2155 cm.$^{-1}$.

EXAMPLE 22

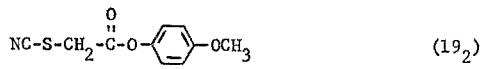
($19_2$)

To 20.1 grams (0.1 mol) of 4-methoxy-phenyl-alpha-chloro-acetate dissolved in 200 ml. of acetone were added 9.7 grams (0.1 mol) of potassium thiocyanate in 75 ml. of acetone. The reaction mixture was refluxed for 24 hours and the resulting solid was filtered. After removal of the acetone under reduced pressure, the residual brown oil was dissolved in methylene chloride, washed with water and dried over magnesium sulfate. The methylene chloride was removed under reduced pressure giving 8.5 grams of a brown oil, i.e. thiocyanato-acetic acid 4-methoxy-phenyl ester.

*Analysis.*—Calc. for sulfur (percent): 14.3. Found (percent): 14.1.

I.R. absorption: 1750, 2145 cm.$^{-1}$.

EXAMPLE 23

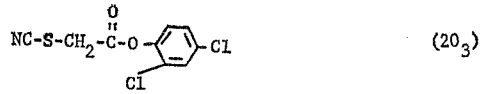
($20_3$)

To 12 grams (0.05 mol) of 2,4-dichloro-phenyl-alpha-chloro-acetate in 400 ml. of acetone were added 4.9 grams (0.05 mol) of potassium thiocyanate. The reaction mixture was heated at 50° C. for 24 hours. The resulting solid was filtered and the acetone was removed under reduced pressure. The residue was dissolved in methylene chloride, washed with water, and dried over magnesium sulfate. Removal of the methylene chloride under reduced pressure gave an oil which crystallized on standing. Washing this crystallized solid with hexane gave orange crystals which on recrystallization from a chloroform-hexane mixture gave 5 grams of thiocyanato-acetic acid 2,4-dichloro-phenyl ester, in the form of tan crystals melting at 76–79° C.

*Analysis.*—Calc. for (percent): Carbon, 41.5; hydrogren, 1.9; nitrogen, 5.4. Found (percent): Carbon, 40.7; hydrogen, 1.9; nitrogen, 5.2.

I.R. absorption: 1765, 2150 cm.$^{-1}$.

It will be realized by the artisan that all of the foregoing compounds contemplated by the present invention possess the desired strong fungicidal properties, with regard to a broad spectrum of activity, as well as a comparatively low toxicity to warm-blooded creatures and a concomitantly low phytotoxicity, enabling such compounds to be used with correspondingly favorable compatibility with warm-blooded creatures and higher plants for more effective control and/or elimination of fungi by the application of such compounds to such fungi and/or their habitat.

It will be appreciated that the instant specification and examples are set forth by way of illustration and not limitation, and that various modifications and changes may be made without departing from the spirit and scope of the present invention.

What is claimed is:

1. Mercapto-carboxylic acid phenyl ester of the formula:

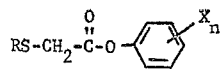

in which R is selected from the group consisting of phenyl; substituted phenyl which is substituted with 1–3 substituents selected from the group consisting of halo and alkyl of 1–4 carbon atoms; X, each individually, is selected from the group consisting of chloro, bromo, alkoxy of 1–4 carbon atoms, fluoro-substituted alkyl of 1–4 carbon atoms having 1–3 fluoro groups, and nitro; and $n$ is a whole number from 1 to 5.

2. Compound according to claim 1 wherein R is selected from the group consisting of chlorophenyl, dichlorophenyl, $C_{1-4}$ alkyl phenyl, X, each individually, is selected from the group consisting of chloro, bromo, $C_{1-4}$ alkoxy, trifluoromethyl and nitro, and $n$ is 1–4.

3. Compound according to claim 1 wheerin such compound is 4-chloro-phenylmercapto-acetic acid 2',4',5'-trichloro-phenyl ester of the formula:

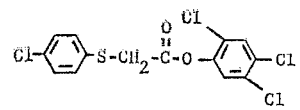

4. Compound according to claim 1 wherein such compound is 2,4-dichloro-phenylmercapto-acetic acid 2',4',5'-trichlorophenyl ester of the formula:

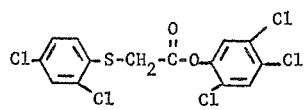

5. Compound according to claim 1 wherein such compound is 2,4-dichloro-phenylmercapto-acetic acid 2',4',5'-trichlorophenyl ester of the formula:

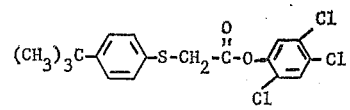

References Cited

UNITED STATES PATENTS 2,897,081    7/1959    Dersch et al. _____ 260—470 X

LORRAINE A. WEINBERGER, Primary Examiner

J. F. TERAPANE, Assistant Examiner

U.S. Cl. X.R.

260—306, 455 A, 454, 470, 479 S; 424—270, 300, 302, 308, 311, 313

PO-1050
(5/69)

UNITED STATES PATENT OFFICE
CERTIFICATE OF CORRECTION

Patent No. 3,657,318                      Dated April 18, 1972

Inventor(s) Peter E. Newallis et al.

It is certified that error appears in the above-identified patent and that said Letters Patent are hereby corrected as shown below:

Col. 3, line 67

"chloroa" should be "chloro"

Col. 7, No. (10$_1$)

2nd figure in column for "Conc in p.p.m" should be "100" rather than "10"

Col. 7, No. (11$_1$)

"(CH$^2$)" should be "(CH$_2$)"

Col. 12, line 46

"4.2 grams" should be "14.2 grams"

UNITED STATES PATENT OFFICE
CERTIFICATE OF CORRECTION

Patent No. 3,657,318  Dated April 18, 1972

Inventor(s) Peter E. Newallis et al.

It is certified that error appears in the above-identified patent and that said Letters Patent are hereby corrected as shown below:

Col. 13, lines 1-2

Should read as follows:

"Analysis Calc. (percent):  Cl, 37.2    8.39

Found              36.3    7.62."

Signed and sealed this 5th day of December 1972.

(SEAL)
Attest:

EDWARD M. FLETCHER, JR.  ROBERT GOTTSCHALK
Attesting Officer  Commissioner of Patents